Patented Mar. 8, 1927.

1,620,208

UNITED STATES PATENT OFFICE.

HENRY HOWARD, OF CLEVELAND, OHIO, ASSIGNOR TO THE GRASSELLI CHEMICAL COMPANY, OF CLEVELAND, OHIO, A CORPORATION OF OHIO.

INSECTICIDE.

No Drawing.     Application filed September 15, 1924. Serial No. 737,914.

I have discovered that barium silicofluoride possesses valuable insecticidal properties and my present invention therefore resides in insecticides consisting of and comprising barium silicofluoride or, in other words, in the use of barium silicofluoride either alone or in combination with other materials such as other insecticidal substances, vehicles, diluents, adhesives, etc., for insecticidal purposes.

Barium silicofluoride and methods of making it are well known. For use as an insecticide it should be in a finely divided form such as may be produced either by grinding or by chemical precipitation methods or both.

The barium silicofluoride may be applied for insecticidal purposes in any of the usual ways for the application of solid finely divided insecticidal materials, for instance, by dusting or by spraying suspensions thereof in water or other liquid vehicle. It may be used alone or mixed with other insecticidal materials or with inert materials or diluents designed, for instance, to improve its suspending properties and adherence.

Barium silicofluoride is inexpensive and comparatively insoluble and has been found to be toxic to insect life, being comparable in this respect to calcium arsenate. It is effective against the boll weevil and leaf eating insects in general, and moreover possesses the highly important property of not burning delicate foliage. A further valuable characteristic of barium silicofluoride is that it apparently absorbs moisture and remains for a considerable time upon the foliage to which it is applied in a flocculent or moist condition.

A suitable composition for use in spraying cotton plants may be prepared by mixing finely divided barium silicofluoride, water and syrup in the proportions of about two pounds of barium silicofluoride to one-half gallon of water and one gallon of syrup.

I claim:—

1. As an insecticide barium silicofluoride.
2. An insecticidal material comprising barium silicofluoride.
3. Method of protecting plant life against insects which comprises applying thereto barium silicofluoride.
4. Method of protecting plant life against insects which comprises applying thereto an insecticidal material comprising barium silicofluoride.

In testimony whereof, I affix my signature.

HENRY HOWARD.